United States Patent [19]
Laing

[11] 3,710,156
[45] Jan. 9, 1973

[54] ROTATING ELECTRIC MACHINE WITH EVAPORATION COOLING

[76] Inventor: Nikolaus Laing, Hofener-Weg 35-37, Aldingen near Stuttgart, Germany

[22] Filed: Nov. 30, 1970
[21] Appl. No.: 93,531

[30] Foreign Application Priority Data

Dec. 1, 1969 Austria....................................11203

[52] U.S. Cl. .......................310/54, 310/86, 417/420
[51] Int. Cl. .............................................H02k 9/20
[58] Field of Search........310/54, 55, 86, 57, 87, 104; 417/420

[56] References Cited

UNITED STATES PATENTS

| | | |
|---|---|---|
| 2,634,375 | 4/1953 | Guimbal............................310/54 X |
| 2,683,823 | 7/1954 | Cunningham et al. .................310/52 |
| 3,294,991 | 12/1966 | Ward et al...............................310/54 |
| 3,438,328 | 4/1969 | Laing.....................................103/87 |

Primary Examiner—D. F. Duggan

[57] ABSTRACT

An electric rotating machine having a stator or a pole ring producing a rotating magnetic field and a rotor supported in the fluid being conveyed where said stator or pole ring is hermetically sealed in a housing which is filled with a saturated vapor of an electrically non-conducting material whose boiling point is below the highest permissible temperature of components producing electric resistance power.

6 Claims, 3 Drawing Figures

PATENTED JAN 9 1973   3,710,156
FIG. 1
FIG. 2
FIG. 3
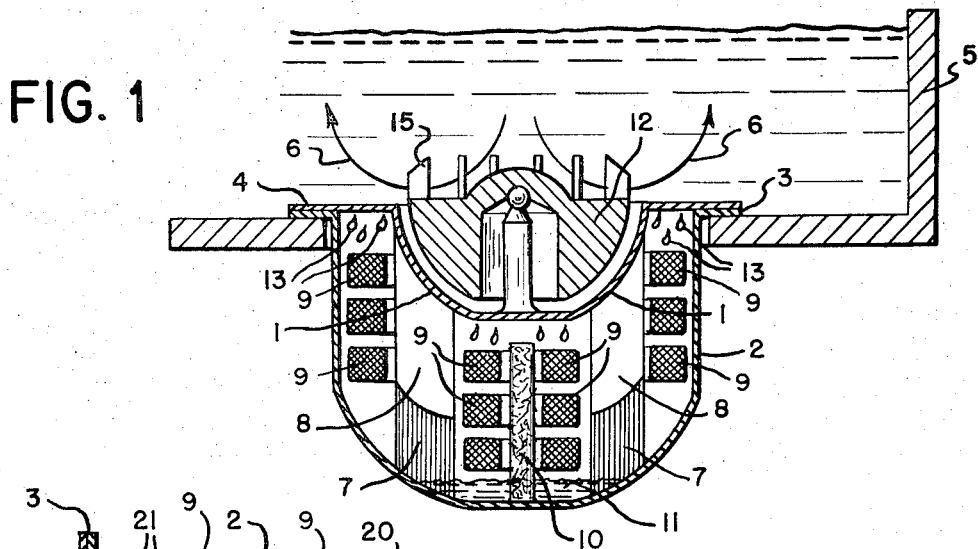
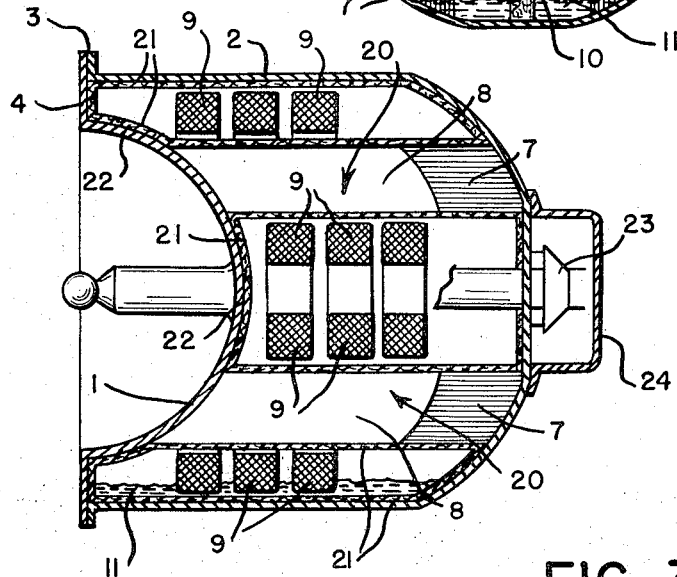
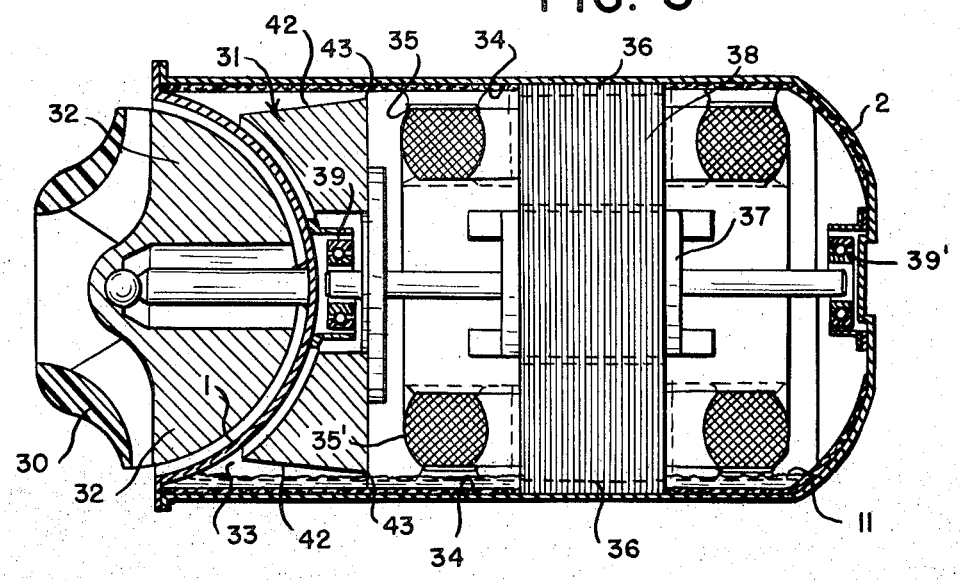

ROTATING ELECTRIC MACHINE WITH EVAPORATION COOLING

THE PRIOR ART

In conventional split-tube pumps the split tube is brought into good heat conductive contact with the stator. The winding is only in indirect heat conductive communication with the laminations, electrically and also thermally insulating slot linings being interposed. No direct heat conductive communication whatever exists as regards the regions of maximum heat development, namely the end windings. Consequently the permissible specific loading of such motors is very low and the material requirements correspondingly high. By contrast with motors having outwardly extending shafts, motors having rotors disposed in a liquid medium being conveyed cannot be provided with additional air cooling by means of a fan, unless a second armature is introduced into the same stator field, which would entail the provision of considerable mechanical equipment. The considerable overdimensioning of the stator required in view of the unfavorable cooling conditions is, in accordance with the invention, avoided by means of cooling by evaporation of an electrically non- conductive liquid.

Rotating electric machines in which the condensate of a non-conductive liquid is conducted to the stator are known in the refrigerator art. Condensate is conducted over the windings of the electric motor where it evaporates, the gas phase is conveyed to a compressor which compresses the gas, thereafter the gas condenses in an air- or water-cooled condenser, in order to be returned to the motor.

OBJECT OF THE INVENTION

The object of the invention is the cooling of stators of rotating electric machines having a definite heat sink, particularly pump motors which form part of turbo-units, The heat from the stators of such turbo-machine motors in which the stators are in heat conductive relationship with the medium being conveyed through a non-magnetic wall, e.g., a split tube or a spherical separating membrane, is given off to the medium being conveyed.

DESCRIPTION OF THE INVENTION

The invention also makes use of a non-conductive liquid. At the internal pressure chosen, the boiling point should be below the temperature of the winding. The solution in accordance with the invention however does not require a compressor. The stator of the rotating machine in accordance with the invention is enclosed and hermetically sealed. Its interior is filled with saturated vapor and a small quantity of the condensate of a volatile liquid, e.g., a fluorine hydrocarbon or a silicon compound. In operation the vapor condenses on the separating wall which is in heat-conductive communication with the medium being conveyed, and is then conducted into the motor winding where it evaporates. As compared with conventional cooling methods, this method enables approximately twenty-fold heat flows to be achieved for a temperature difference of only a few degrees C between the winding temperature and the heat sink, i.e., the separating wall which is in heat conductive contact with the medium being conveyed.

In this way cooling of the winding is adequate even where the heat carrier assumes a high temperature, as for example in the case of circulating pumps for heating systems. The condensate is conveyed either by capillary action in the laminations or preferably by capillary action in a special slot lining or pole envelope or also by means of special absorbent strips of wicks, one end of which touches the wall which separates the medium being conveyed and which acts as a condenser, or which extends right into the condensate sump.

The inventive principle is not limited to semi-wet induction motors which are separated from the armature by a separating wall disposed in the magnet gap, but may also be applied to hermetically sealed motors which drive a magnetic coupling, the arrangement being such that the driving half coupling carries the second half coupling, which is disposed outside the hermetically sealed space, with it via a non-magnetic separating wall. In this application a material is selected for the saturated vapor and the condensate which does not dissolve the lubricant of the motor bearing, in the case of oil, for example, Frigen 113. Finally, the condensate itself may also serve as the lubricant, particularly where part of the bearing is in heat conductive contact with a heat sink.

Thus the invention consists in a stator of an electric motor or generator which produces a rotating magnetic field directly or via a rotated soft- or permanent magnetic pole ring, the rotating magnetic field being conducted through a magnetically permeable separating wall and rotating outside the hermetically encapsulated space a permanent- or soft magnetic pole ring, preferably the armature of an electric motor which accelerates the runner of a turbo-machine and thus the medium conveyed in the turbo-machine. The medium being conveyed in the turbo-machine is in good heat conductive communication with a wall region of the hermetically encapsulated space in which the pole ring is enclosed. Its surface which faces the interior of the hermetically encapsulated space forms a condenser for an electrically non-conductive liquid which evaporates below the permissible winding temperature and whose condensate is returned to the winding in suitable manner, particularly through capillary linings.

The invention will be explained in greater detail with reference to the drawings;

DESCRIPTION OF THE DRAWINGS

FIG. 1 is a side sectional view of an electric motor having a rotating part adapted to be immersed in a fluid;

FIG. 2 is a side sectional view of an electric motor constructed according to the invention which may be assembled in any desired axial position; and FIG. 3 is a sectional view of an electric motor having a rotatable pole ring associated with the motor to drive a pump impellor.

FIG. 1 shows an electric motor with a spherical air gap. Between the stator 7 which is in the form of a sheet iron spiral structure, and the rotating rotor 12 consisting of soft iron and, if desired, a squirrel cage winding for driving the runner 15 of a mixer, the separating shell 1 is provided which is connected in gas-tight manner to the housing 2 at its periphery 3. The flange 4 thereby formed is used for suspending the motor in the aperture of a container wall of the container 5 which contains liquid material which is intended to be mixed and caused to flow along the flow lines 6. The stator 7 consists of a spirally wound sheet metal piece having uniformly distributed slots 8 containing windings 9. A wick 10 is arranged at the center of the motor and dips into a sump 11 in which the condensate of the saturated vapor which fills the inside of the motor collects. The condensate 11 rises through the wick 10 and is evaporated by the heat of the windings 9. The vapor then condenses at the coldest point of the interior of the motor, i.e., at the separating shell 1, and thence the condensate drips on to the windings 9, as shown at 13, whereupon it again evaporates.

FIG. 2 shows the stator of a rotating electric machine with a spherical air gap 1, which may be assembled in any desired axial position. Strips of sleeves 21 of absorbent material, e.g., glass silk, asbestos or cotton, which touch the shell 1 at 22 are provided between the windings 9 and the poles 20. By this means the condensate which has precipitated on the shell migrates into the interstices between the winding 9 and the magnet irons 7, 20 into the motor and is there evaporated. An insulating extension 23 is provided at, and taken through, the housing 2 which is hermetically sealed and conducts the current therethrough in known manner. It is covered by an extension box 24. In the position shown the condensate 11 collects in the lowest region.

FIG. 3 shows a drive unit for the pump impellor 30 consisting of a motor and a concave magnet ring 31, the latter driving the convex magnet ring 32 of the pump impellor 30 which consists of soft- or permanent magnetic material, through the separating shell 1. The rotation of the concave magnet ring 31 causes the condensate to be thrown outwardly into the annular region 33 and thence to be conducted through an absorbent cylinder 34, which again may consist of textile or mineral fibers, to the end winding 35 of the motor. There the evaporation takes place, so that even at extremely low temperature differentials heat is withdrawn from the end winding 35 and thus from the entire winding. In flattened or recessed regions 36 of the pole ring 38 the absorbent material of the cylinder 34 is continued to the other side of the pole ring 38, so that the end windings 35' are also cooled. The armature 37 and the concave magnet ring 31 are supported in bearings 39/39' which are attached to the separating shell 1 and the outer housing respectively. The concave magnet ring 31 has a conical surface area 42, whereby the condensate runs along the surface up to the outermost edge 43, is then thrown off by centrifugal force and sprayed against the end winding 35. Again at standstill the condensate 11 collects at the lowest point.

I claim

1. An electric rotatable machine having a rotor, a stator and a non-magnetic separating wall positioned between said rotor and stator; the improvement comprising having in addition a hermetically sealed housing enclosing said stator of which said separating wall forms a part, a condensate of an electrical non-conductive material in said housing where said material has a boiling point which is less than the highest permissible operating temperature to which said stator may be subjected and which is above the ambient temperature of said machine at a predetermined operational internal pressure of the housing, a vapor of said condensate substantially filling the unoccupied spaces in said housing, and means for bringing said condensate into thermal contact with heated portions of said stator to cool the same.

2. An electric rotatable machine according to claim 1 wherein said separating wall forms a condenser which condenses part of said vapor into said condensate and having in addition absorbent bodies for removing said condensate from said separating wall to the heated portion of said stator by capillary action.

3. An electric rotatable machine according to claim 1 wherein an absorbent body forms an electrically insulated jacket for a pole of said stator.

4. An electric rotatable machine according to claim 1 wherein said separating wall serves to cool and condense the vapor in the housing and wherein the stator has a laminated core with narrow strips therein through which the condensate may penetrate to the interior of the stator to cool the same.

5. An electric rotatable machine according to claim 1 wherein said separating wall is in heat conductive contact with ambient temperature exterior of the housing and wherein heated portions of said stator are positioned below said separating wall.

6. An electric rotatable machine having a rotor, a stator and a non-magnetic separating wall positioned between said rotor and stator; the improvement comprising having in addition a hermetically sealed housing enclosing said stator of which said separating wall forms a part, a condensate of electrical non-conductive material in said housing where said material at the desired operating temperature of the separating wall is also in a vapor phase, said vapor substantially filling the unoccupied spaces in said housing, and means for bringing said condensate into thermal contact with heated portions of said stator to cool the same.

* * * * *